United States Patent [19]

Rimmer et al.

[11] Patent Number: 6,063,860
[45] Date of Patent: May 16, 2000

[54] WATER DISPERSIBLE BLOCKED ISOCYANATES

[75] Inventors: Ian Kevin Rimmer; Richard Alan Spencer, both of Baxenden, United Kingdom

[73] Assignee: Baxenden Chemicals Limited, United Kingdom

[21] Appl. No.: 09/051,218

[22] PCT Filed: Oct. 4, 1996

[86] PCT No.: PCT/GB96/02440

§ 371 Date: Apr. 29, 1998

§ 102(e) Date: Apr. 29, 1998

[87] PCT Pub. No.: WO97/12924

PCT Pub. Date: Apr. 10, 1997

[30] Foreign Application Priority Data

Oct. 5, 1995 [GB] United Kingdom .................... 9520317

[51] Int. Cl.[7] .............................. C08J 3/00; C08K 3/20; C08L 75/00; C08G 18/00; C08G 18/81

[52] U.S. Cl. ........................... 524/590; 524/591; 524/839; 524/840; 528/45

[58] Field of Search ..................... 524/590, 591, 524/839, 840; 528/44, 45

[56] References Cited

U.S. PATENT DOCUMENTS

| | | |
|---|---|---|
| 4,008,247 | 2/1977 | Tucker . |
| 4,016,120 | 4/1977 | Matsuda et al. . |
| 4,098,933 | 7/1978 | Burkhardt et al. . |
| 4,200,725 | 4/1980 | Gras et al. . |
| 4,322,327 | 3/1982 | Yoshimura et al. . |
| 4,507,427 | 3/1985 | Potter et al. . |
| 4,522,851 | 6/1985 | Rosthauser . |
| 5,210,169 | 5/1993 | Mühlebach et al. . |
| 5,294,665 | 3/1994 | Pedain et al. . |

FOREIGN PATENT DOCUMENTS

| | | |
|---|---|---|
| 0 159 117 | 10/1985 | European Pat. Off. . |
| 0 500 495 A2 | 8/1992 | European Pat. Off. . |
| 0 576 952 A2 | 1/1994 | European Pat. Off. . |
| 30 39 271 A1 | 4/1981 | Germany . |
| WO 94/22935 | 10/1994 | WIPO . |
| WO95/06674 | 3/1995 | WIPO . |

*Primary Examiner*—Patrick D. Niland
*Attorney, Agent, or Firm*—Nixon & Vanderhye

[57] ABSTRACT

A water dispersible blocked polyisocyanate of formula (I) $R-Y_m$, where R is an m valent group comprising an aliphatic, cycloaliphatic, heterocyclic or aromatic group and comprising at least three consecutive ethylene oxide groups or at least one residue of a polyhydroxy carboxylic acid, and each group Y, which may be the same or different, is a group of formula (II),

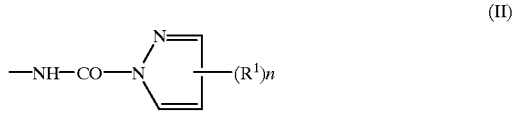

(II)

where each $R^1$ is the same or different when n is more than 1 and each $R^1$ is an alkyl, alkenyl, aralkyl, N-substituted carbamyl, phenyl, $NO_2$, halogen or a group $-C(O)-O-R^2$ where $R^2$ is hydrogen or an alkyl group; n is 0, 1, 2 or 3; and m is an integer of 2 or more.

25 Claims, No Drawings

WATER DISPERSIBLE BLOCKED ISOCYANATES

The present invention relates to water dispersible blocked polyisocyanates, methods for making them, water-based storage stable materials, and coatings containing them.

Blocked polyisocyanates are commonly used in coatings, such as paints, which also contain active hydrogen containing compounds e.g. amines and alcohols. These coatings are deposited onto the article to be coated and then subsequently hardened by heating, often referred to as stoving. During stoving the blocked polyisocyanates dissociate so that the isocyanate groups become available to react with the active hydrogen containing compounds. This leads to crosslinking and hardening of the coating.

A blocked polyisocyanate coating composition ideally has two properties: (a) a dissociation temperature low enough to allow hardening without heating to temperatures which degrade the coated item and (b) water dispersibility so that the use of organic solvents can be kept to a minimum or eliminated. However, generally a blocked polyisocyanate having a low dissociation temperature will be highly reactive and thus will be inherently unstable in water so that the two properties are incompatible.

Various means for increasing water dispersibility have been described.

U.S. Pat. No. 4,522,851 describes a water-dispersible blocked isocyanate in which a hydrophilic group such as an anionic group is chemically incorporated into the polyisocyanate component to make the blocked polyisocyanate water-dispersible. U.S. Pat. No. 4,507,427 describes aqueous blocked polyisocyanate solutions or dispersions produced by mixing the blocked polyisocyanate with water in the presence of enough base to guarantee the solubility or dispersibility of the polyisocyanates. U.S. Pat. No. 4,098,933 describes water-dispersible blocked polyisocyanates in which the blocking groups contain a hydrophilic group such as a carboxylic acid salt or polyethylene oxide units.

Most conventional blocked polyisocyanates dissociate at temperatures of around 160° C. EP-A-0159117 discloses pyrazole blocked polyisocyanates which dissociate at a temperature significantly lower than this. Since the pyrazole blocked polyisocyanates are more reactive than conventional blocked isocyanates, they are inherently less stable.

The present inventors have now established that, despite their high reactivity, certain pyrazole blocked polyisocyanates can be used in aqueous dispersion coating compositions and that the compositions have good storage stability. Accordingly the present invention provides a water dispersible blocked polyisocyanate of the formula (I)

$$R—Y_m \quad (I)$$

where R is an m valent group comprising an aliphatic, cycloaliphatic, heterocyclic or aromatic group and comprising at least three consecutive ethylene oxide groups or at least one residue of a polyhydroxy carboxylic acid, and each group Y, which may be the same or different, a group of formula (II)

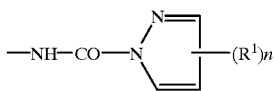

(II)

where

R$^1$ is an alkyl, alkenyl, aralkyl, N-substituted carbamyl, phenyl, NO$_2$, halogen or a group —C(O)—O—R$^2$ where R$^2$ is hydrogen or an alkyl group;

n is 1, 2 or 3; and m is an integer of 2 or more.

Preferably m is an integer from 2 to 6, for example 2, 3, 4, 5 or 6. When n is 2 or 3, the groups R$_1$ may be the same or different. When R—Y$_m$ contains more than one group —C(O)OR$^2$, the groups R$^2$ may be the same or different.

In addition the present invention provides a water dispersible mixture of blocked polyisocyanates each of the formula $$R—Y_m$$

where the groups R are the same or different and each is an m valent group comprising an aliphatic, cycloaliphatic heterocyclic or aromatic group and wherein from 5 to 100 eq.wt % (preferably from 10 to 100 eq.wt %) of groups R comprise at least three consecutive ethylene oxide groups or at least one residue of a polyhydroxy carboxylic acid, and each group Y, which may be the same or different, is a group of formula (II) as defined above.

According to a further embodiment, the invention provides a water dispersible product obtainable by (a) contacting a polyisocyanate of formula (III)

$$R^a(NCO)_q \quad (III)$$

wherein

R$^a$ is a q valent group comprising an aliphatic, cycloaliphatic, heterocyclic or aromatic group and q is an integer greater than 2, with an active hydrogen-containing compound bearing a hydrophilic group which is —(CH$_2$CH$_2$O)$_p$— where p is 3 or more or with a polyhydroxy carboxylic acid group or derivative thereof to form a water dispersible polyisocyanate of formula R(NCO)$_m$ where R is an m valent group comprising an aliphatic, cycloaliphatic, heterocyclic or aromatic group comprising at least three consecutive ethylene oxide groups or a residue of a polyhydroxycarboxylic acid; and (b) blocking the water dispersible polyisocyanate produced in step (a) with a pyrazole of formula (IV)

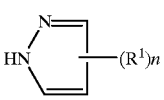

(IV)

wherein R$^1$ and n are as defined in relation to formula (I) above.

A substance is considered to be water dispersible for the purposes of the present invention if it forms a dispersion in water which is uniform on a macroscopic scale but consists of particles or droplets of the substance in water. Preferably the dispersion is a colloid, in which, for example, the particles or droplets of the dispersed substance have a diameter which is about the wavelength of light, for example about 500 nm. In general the particle or droplet is an aggregate of numerous molecules, but is too small to be seen with an optical microscope. The particles or droplets generally pass through most filter papers but can usually be detected by light-scattering, sedimentation and osmosis. Preferably the dispersion is an emulsion or sol of blocked polyisocyanate in water. An emulsion is generally a dispersion of liquid in liquid. A sol is generally a dispersion of a solid in a liquid.

An alkyl, alkenyl or aralkyl group may be a branched or straight chain group and may be substituted, for example with a halogen, such as fluorine, chlorine or bromine, or —OH. An alkyl group is preferably a $C_1$ to $C_6$ alkyl group, more preferably a $C_1$ to $C_4$ alkyl group, for example, methyl, ethyl, propyl, isopropyl, butyl, sec-butyl or tert-butyl. Most preferably it is methyl. An alkenyl group is preferably a $C_2$ to $C_6$ alkenyl group, for example $C_2$, $C_3$, $C_4$, $C_5$ or $C_6$ alkenyl. An aralkyl group preferably has substituted or unsubstituted phenyl as the aryl portion. The alkyl portion is generally an alkyl group as defined above.

A polyhydroxy carboxylic acid is a compound having 2 or more hydroxyl groups and one or more carboxylic acid groups, such as dimethylolpropionic acid.

Preferably n is 2 or 3.

Preferably m is an integer from 2 to 6. More preferably m is 2 or 3.

A halogen is, for example chlorine, bromine or fluorine. Preferably it is chlorine or bromine.

An N-substituted carbamyl group is generally of formula —C(O)NR$^3$R$^4$, where R$^3$ and R$^4$ may be the same or different and each is hydrogen or an alkyl or alkenyl group, provided that R$^3$ and R$^4$ are not both hydrogen.

According to one embodiment the group R in the blocked isocyanate of formula (I) comprises at least three consecutive ethylene oxide groups or at least one residue of a polyhydroxy carboxylic acid. According to a second embodiment, from 5 to 100% by equivalent weight of groups R comprise at least three consecutive ethylene oxide groups or at least one residue of a polyhydroxycarboxylic acid.

Consecutive ethylene oxide groups are groups bonded directly together. Three consecutive ethylene oxide groups can be represented as —(CH$_2$CH$_2$O)$_3$—. When R comprises consecutive ethylene oxide groups, it preferably comprises at least five, for example at least 7, 9 or 12 consecutive ethylene oxide groups. Preferably R comprises 0.01 to 25% by weight, based on the weight of the unblocked polyisocyanate, of ethylene oxide units, more preferably 0.5 to 25% by weight. R may comprise further ethylene oxide groups which are not consecutive with or bonded directly to the three consecutive ethylene oxide groups.

When R comprises residues of polyhydroxy carboxylic acid, it preferably comprises at least 2 residues, preferably at least 3, for example 5, 8, 12 or more residues of polyhydroxy carboxylic acid. Preferably R comprises 0.01 to 25% by weight, based on the weight of the unblocked polyisocyanate of polyhydroxy carboxylic acid residues, more preferably 0.5 to 25% by weight.

R may comprise residues of polyhydroxy carboxylic acid as well as at least three consecutive ethylene oxide groups. When less than 100 wt % of groups R comprise at least one residue of polyhydroxy carboxylic acid or at least three consecutive ethylene oxide groups, preferably at least 15 wt %, for example, at least 20, 30, 40, 50 or 60 wt % of groups R comprise at least one residue of polyhydroxy carboxylic acid or at least three consecutive ethylene oxide groups.

When the polyhydroxy carboxylic acid is dimethylol propionic acid (DMPA) the ratio of isocyanate/hydroxyl groups is generally 0.05 to 0.7, preferably 0.2 to 0.3 on an equivalent weight basis, so isocyanate is in excess.

Preferably at least one group Y is

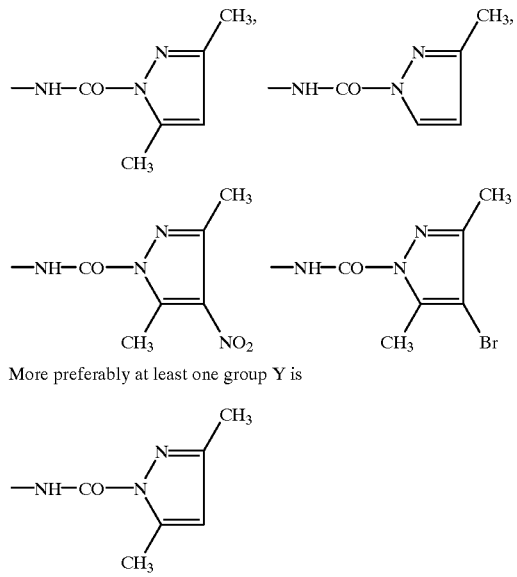

More preferably at least one group Y is

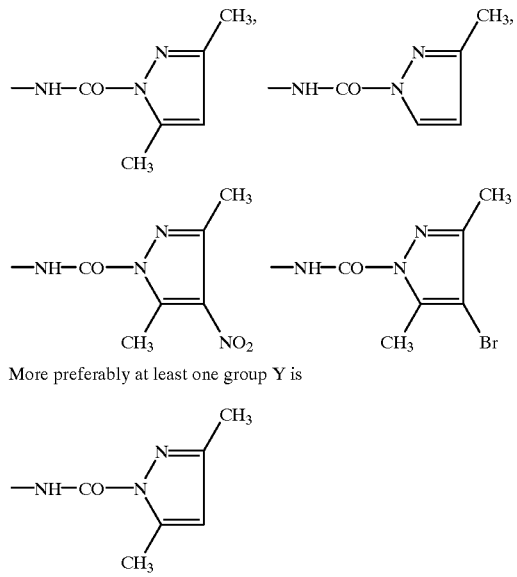

The present invention provides a process for producing a water dispersible blocked polyisocyanate which process comprises contacting a polyisocyanate of formula R(NCO)$_m$ with a blocking agent, where R and m are defined as for the blocked isocyanate of formula (I). Preferably the resulting blocked polyisocyanate contains no free isocyanate groups.

The present invention further provides a process which comprises (a) contacting a conventional polyisocyanate of formula (III) as defined above with an active hydrogen-containing compound bearing a hydrophilic group which is —(CH$_2$CH$_2$O)$_p$— where p is 3 or more or a carboxylic acid group or derivative thereof to form a water dispersible polyisocyanate of formula R(NCO)$_m$; and (b) blocking the water dispersible polyisocyanate produced in step (a) with a pyrazole of formula (IV) as defined above.

The blocking agents used in the present invention are pyrazoles of the formula (IV) as defined above. Examples of suitable pyrazoles include 3,5-dimethylpyrazole, 3-methylpyrazole, 4-nitro-3,5-dimethylpyrazole and 4-bromo-3,5-dimethylpyrazole. The preferred blocking agent is 3,5-dimethylpyrazole.

The polyisocyanate of formula R(NCO)$_m$ which is to be blocked is a water dispersible organic polyisocyanate suitable for crosslinking compounds containing active hydrogen. Suitable polyisocyanates comprise, for example, aliphatic groups including cycloaliphatic, aromatic, heterocyclic, and mixed aliphatic aromatic groups. The polyisocyanates contain 2, 3 or more isocyanate groups.

The polyisocyanate of formula R(NCO)$_m$ may be, for example, selected from those described in U.S. Pat. No. 4,522,851 or may be a polyisocyanate prepolymer obtained by reacting a conventional polyisocyanate, such as a diisocyanate, with a compound comprising at least three consecutive ethylene oxide units or at least one polyhydroxy carboxylic acid residue.

The conventional polyisocyanates are generally $C_1$ to $C_{12}$ alkylene diisocyanates, or dimers or trimers thereof, aryl diisocyanates or cycloalkyl diisocyanates. The conventional polyisocyanates include, for example toluene diisocyanate, such as 2,4- and 2,6-toluene diisocyanate ethylene diisocyanate and mixtures thereof, propylene diisocyanate, 4,4-diphenylmethane diisocyanate, p-phenylene diisocyanate, tetramethylene diisocyanate, hexamethylene diisocyanate, decamethylene diisocyanate, dodecamethylene diisocyanate, 2,4,4-trimethylhexamethylene-1,6 diisocyanate, phenylene diisocyanate, tolylene or naphthylene diisocyanate, 4,4'-methylene-bis(phenyl isocyanate), 4,4'-ethylene-bis(phenyl isocyanate), ω,ω'-diisocyanato-1,3-dimethyl benzene, ω,ω'-diisocyanato-1,4-dimethylcyclohexane, ω,ω'-diisocyanato-1,4-dimethyl benzene, ω,ω'-diisocyanato-1,3-dimethylcyclohexane, 1-methyl-2,4-diisocyanatocyclohexane, 4,4'-methylene-bis (cyclohexyl isocyanate), 3-isocyanato-methyl-3,5,5-trimethylcyclohexyl isocyanate, dimer acid-diisocyanate, ω,ω'-diisocyanatodiethyl benzene, ω,ω'-diisocyanatodimethyl toluene, ω,ω'-diisocyanatodiethyl toluene, fumaric acid bis(2-isocyanato ethyl)ester, triphenylmethane triisocyanate, 1,4-bis(2-isocyanato-prop-2-yl) benzene and 1,3-bis(2-isocyanato prop-2-yl)benzene.

Particularly preferred conventional polyisocyanates are the biuret, uretdione or isocyanurate of a $C_1$ to $C_{12}$ alkylene diisocyanate, such as 1,6-hexamethylene diisocyanate (HMDI). The isocyanurate of HMDI is the isocyanate "trimer" and has the structure

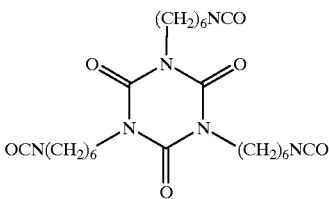

The uretdione of HMDI is the "dimer" and has the structure

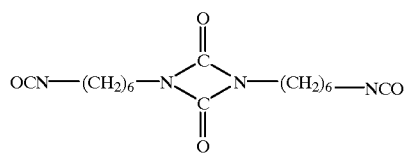

The polyisocyanate prepolymers may be obtained by reaction of an excess amount of the conventional polyisocyanate with an active hydrogen containing compound, for example, a polyol or a polyamine, such as a lower molecular weight polyol or polyamine, for example having a molecular weight of 300 or less, or a medium molecular weight polyol or polyamine, for example a polyol or polyamine having a molecular weight of 300 to 8000.

In addition to the at least one residue of polyhydroxy carboxylic acid or at least three consecutive ethylene oxide groups, the polyol or polyamine preferably comprises, for example, dimers, trimers or polymers of one or more of ethylene glycol, propylene glycol, 1,3-butylene glycol neopentyl glycol, 2,2,4-trimethyl-1,3-pentane diol, hexamethylene glycol, cyclohexane diethanol, hydrogenated bisphenol-A, trimethylol propane, trimethylol ethane, 1,2,6-hexane triol, glycerine, sorbitol or pentaerythritol.

Preferably the polyol or polyamine comprises residues of at least one of diethylene glycol, triethylene glycol or polyethylene glycol, preferably in an amount that the resulting unblocked polyisocyanate comprises 0.01 to 25% by weight of ethylene oxide units. Preferably the active hydrogen containing compound is a polyoxyalkylene amine such as Jeffamine M-1000.

The di- or polyisocyanate obtained by the above reaction may comprise a biuret group having the structure

or an allophanate group having the structure

The polyisocyanate may be cyclic, for example a derivative, such as an ester, of isocyanuric acid.

Preferably the isocyanate group of the polyisocyanate is not bonded directly to an aromatic nucleus in the group R.

The reaction between the polyisocyanate $R(NCO)_m$ and the blocking group is exothermic. Since the reaction product will dissociate if the temperature is raised sufficiently, cooling may be required to keep the temperature of the reaction mixture down, preferably to 80° C. or less. The resulting blocked polyisocyanate is then recovered and may be isolated or purified.

The present invention further provides an aqueous dispersion of at least one blocked isocyanate as defined herein. Surprisingly the aqueous dispersions are storage stable for at least four months at room temperature whilst providing blocked polyisocyanates which dissociate at relatively low temperatures.

At 40° C. these dispersions have been found to be storage stable for several weeks, and up to several months. This has significant commercial benefit, allowing users in warm climates to take advantage of the low unblocking temperatures whilst retaining adequate storage stability.

The dispersions are formed by, for example, stirring or agitating a mixture of water and the blocked isocyanate. Typically the dispersion is formed using an anchor stirrer at 250 to 300 rpm. It is also possible to use a high speed "Greaves" mixer to disperse the product.

The dispersions may additionally comprise at least one of an emulsifier, a detergent, a colourant, a pigment, a resin, a surfactant, a catalyst or an antioxidant. Preferably the dispersions contain only water and blocked isocyanate. Generally the dispersion comprises from 5 to 95% by weight, based on the weight of the dispersion, of blocked polyisocyanate, preferably 30 to 70%, more preferably 35 to 60% by weight of blocked polyisocyanates.

The present invention further provides a water-based coating composition which comprises an aqueous dispersion as defined above and at least one compound containing an active hydrogen, selected from, for example, alcohols, amines, polyhydroxy-polyesters, polyhydroxy polyethers, polylactones, hydroxypolycarbonates, polythioethers, polyacetals, polyether esters, polyester amides and polyamide-polyamine resins, e.g. the product from a dimer fatty acid and an aliphatic polyamide.

Preferably the compound containing an active hydrogen atom is an acrylic resin containing a carboxylic acid group and hydroxy groups, a water dispersible polyester or polyether resin or a hydroxyacrylic resin containing a tertiary amine group, or polymers thereof.

Generally the coating composition comprises from 10 to 90% by weight based on the weight of the composition of the compound containing an active hydrogen atom.

Typically the coating composition may comprise at least one of an emulsifier, a detergent, a colourant, a pigment, a resin, a surfactant, a catalyst, an antioxidant, a dispersing aid, a fungicide, a viscosity modifier, a defoamer, a flow additive or a coalescing solvent.

The coating compositions of the present invention conveniently provide one component storage stable coating formulations, which are generally stable for at least four months at room temperature, that is at a temperature between 15 and 22° C., generally, 16, 17 or 18° C.

Typically a coating composition according to the invention will comprise components in the following proportions:

| Component | Parts by weight |
| --- | --- |
| 1) Water | 8.0 |
| 2) Dispersing Aid | 0.3 |
| 3) Dimethylaminoethanol | 0.6 |
| 4) Fungicide | 0.1 |
| 5) Titanium Dioxide | 18.0 |
| 6) Viscosity Modifier | 3.0 |
| 7) Defoamer | 0.3 |
| 8) Flow Additive | 0.3 |
| 9) Acrylic Emulsion (45% solids) | 47.0 |
| 10) Blocked Isocyanate | 22.0 |
| 11) Coalescing Solvent | 0.4 |

According to a further embodiment of this invention, the coating is a paint composition comprising a pigment carrier containing active hydrogen groups, a pigment and an aqueous dispersion of a compound of formula I.

These paints usually comprise a pigment dispersed in an aqueous dispersion of a pigment carrier. Preferably the pigment carrier is a resin containing an active hydrogen, which resin is to be crosslinked by the polyisocyanate. Preferably the paint contains 0.5 to 2 blocked isocyanate groups per active hydrogen containing group. Suitable active hydrogen containing resins include polyamide-polyamine resins, e.g. the product from a dimer fatty acid and an aliphatic polyamide, carboxylic acid group containing acrylic resins, or tertiary amine group containing hydroxyacrylic resins and polymers thereof.

The total concentration of the dispersed solid will, of course, depend upon the process for which the paint is to be used. Various standard additives such as surface active agents, catalysts and anti-oxidants may also be incorporated.

The coatings according to the invention may be deposited electrophoretically or conventionally e.g. by spray depositing, dipping, applying with a roller or brush, transfer coating, screen painting, electrostatic spraying, using a doctor blade or electrocoating or by other means onto the articles to be coated and then subsequently hardened by heating the deposited coating to crosslink the compound containing an active hydrogen.

The electrophoretic deposition process is well known and involves the use of a cathode and an anode in contact with a bath containing the paint. The surface to be coated is the surface of one of the electrodes. On applying a voltage of generally 1 to 3,000 volts across the electrodes the paint is deposited onto the surface of one of the electrodes.

The coated article is removed from the bath and stoved e.g. baked in an oven. The blocking groups dissociate from the isocyanate groups, which then react with the compound containing the active hydrogen. This results in crosslinking and hardening of the coating. Coating compositions according to this invention are generally hardened at temperatures from 100 to 180° C., for instance at up to 140° C. or, preferably, up to 120° C.

The present invention further provides the use of an aqueous dispersion of a blocked isocyanate as defined herein as a coating composition, such as a paint.

Other uses of the aqueous dispersions and coating compositions of the invention include clear coatings (similar to paints but lacking opaque pigments) and water based textile coatings and crosslinkers for fabrics. The low unblocking temperature permits the aqueous dispersions and coating compositions to be used to coat relative heat sensitive substrates such as plastics which would melt or degrade at higher storing temperature. A preferred use of the aqueous dispersions and coating compositions is in the automotive industry, for instance in or as primers, basecoats, topcoats and lacquers for automobiles.

The present invention further provides a coating process which comprises applying the coating to an item and heating it to achieve hardening of the coating.

The invention is illustrated by the following Examples.

EXAMPLES

Example 1

Production of Aqueous Dispersion of Blocked Isocyanate

The following reactants were used:

| | Weight % |
| --- | --- |
| 1) 1,6-Hexamethylene diisocyanate trimer | 30 |
| 2) Polyoxyalkylene amine (Jeffamine M-1000) | 3 |
| 3) 3,5-Dimethyl pyrazole (Blocking agent) | 16 |
| 4) Butyl glycol ether (solvent) | 7 |
| 5) Sodium sulphosuccinate (Disponil SUS 87) | 4 |
| 6) Water | 40 |

(1) was added to a reaction vessel. (2) was slowly added to the reaction vessel. The vessel was heated to 60 to 70° C. until an isocyanate content of 20 to 21 mol % was reached. The temperature was maintained at 60 to 70° C. while (3) was added slowly until an isocyanate content of zero was reached. (4) and (5) were added and mixed for 5 minutes. Water was added and a dispersion was formed using a high speed mixer.

Jeffamine M-1000 is the active hydrogen-containing compound which reacts with the HMDI trimer to form a polyisocyanate prepolymer. Sodium sulphosuccinate is an ionic surfactant which helps to control the particle size of the dispersion.

Example 2

Production of Aqueous Dispersion of Blocked Isocyanate

The following reactants were used:

| | Weiqht % |
| --- | --- |
| 1) 1,6 Hexamethylene disocyanate trimer | 26.7 |
| 2) n-Methyl pyrrolidone | 6.0 |
| 3) Dimethyl pyrazole | 11.3 |
| 4) Dimethylol propionic acid | 1.9 |

-continued

| | Weight % |
|---|---|
| 5) DMAMP 80 (Angus Chemie) | 2.0 |
| 6) Water | 52.1 |

1) was added to a reaction vessel. (2) was added and the vessel heated to 60–70° C. The temperature was maintained at 60–70° C. while (3) was added slowly until an isocyanate content of 2.8% was reached. (4) was added and the reaction continued until an isocyanate content of zero was reached. The batch was cooled to 60° C. before adding (5) and (6).

Example 3

Production of White Paint Composition

| Component | Parts by weight |
|---|---|
| 1) Water | 8.0 |
| 2) Dispersing aid (Dispex 40) | 0.3 |
| 3) Dimethylaminoethanol | 0.6 |
| 4) Fungicide (Acticide SPX) | 0.1 |
| 5) Titanium dioxide | 18.0 |
| 6) Viscosity modifier (Rheovis CR2) | 3.0 |
| 7) Defoamer (Foamex 1488) | 0.3 |
| 8) Flow additive (Aerosol 0775) | 0.3 |
| 9) Acrylic emulsion (Xenacryl (45% solids) DP 9B/1283) | 47.0 |
| 10) Blocked isocyanate | 22.0 |
| 11) Coalescing solvent (Ectrapro EEP) | 0.4 |

Components (1), (2), (4), (5), (7), 0.06 parts by weight of component (3) and 1.5 parts by weight of component (6) were formed into a premixture under high shear in order to achieve good pigment dispersion (maximum particle size: Hegmann 5). The titanium dioxide was added slowly to assist wetting. Components (8) to (11) and the remainder of components (3) and (6) were added and mixed under high shear for 10 minutes.

The components (2), (4), (6), (7), (8), (9), (10) and (11) were obtained from the following manufacturers:

| 2 Dispersing aid | Dispex 40 | Allied Colloids |
|---|---|---|
| 4 Fungicide | Acticide SPX | Thor Industrial Biocides |
| 6 Viscosity modifier | Rheovis CR2 | Allied Colloids |
| 7 Defoamer | Foamex 1488 | Tego Chemie Service |
| 8 Flow additives | Aerosol 0775 | Cytec Industries |
| 9 Acrylic Emulsion | Xenacryl DP9B/1283 | Baxenden Chemicals Ltd. |
| 10 Blocked isocyanate | Obtained by reaction of HMDI trimer with DMPA and blocked with 3,5-dimethylpyrazole (see example 2) | |
| 11 Coalescing solvent | Extrapro EEP | Eastman Chemical Ltd. |

Example 4

Coatings

The white paint composition of Example 3 was coated onto various substrates and stored at 120° C. for 45 minutes. The resultant coatings were tested with the following results

TABLE 1

| TEST | RESULT | TEST METHOD |
|---|---|---|
| Opacity | 96% | R+D Method 22 |
| Gloss 20° | 51% | R+D Method 22 |
| 60° | 82% | |
| Reverse Impact: 1.8 kg weight (1.0 m) | PASSED | ASTM D2794-92 Steel Panels |
| Bend Test: Shim steel panels (3 mm cylindrical mandrel) | PASSED | BS3900 Part E1 |
| Cross cut adhesion: | Rating | BS3900 Part E6 |
| Substrate | | |
| Smooth steel | 0 | ISO 2409 |
| Matt steel | 0 | |
| Tin plate steel | 0 | |
| Aluminium | 0 | |
| Chrome treated aluminium | 0 | |
| Pencil Hardness | | ASTM D3363-92a |
| Gouge Hardness | 3H | |
| Scratch Hardness | 2H | |
| Weathering after 280 hours | | ASTM G5388 |
| Gloss retention | 95% | 4 hrs UVB @ 60° C. |
| Observations on steel substrate | No rusting | 4 hrs condensation @ 50° C. |
| Acetone resistance (double rubs) | >100 units | Standard |

Unless otherwise stated, substrates were standard steel test panels.

Example 5

Production of Clear Coat Formulation

| Component | Parts by weight |
|---|---|
| 1) Xenacryl DP 9B/1345 | 54.1 |
| 2) Blocked polyisocyanate of Example 2 | 25.4 |
| 3) Tegowet KL 245 | 0.5 |
| 4) Estasol | 5.0 |
| 5) Ectapro EEP | 2.0 |
| 6) Water | 13.0 |

Method (1) and (2) were added to a vessel and mixed well. (3), (4) and (5) were added and mixed thoroughly before adding (6).

Suppliers

1) Xenacryl DP9B/1345
   Acrylic emulsion
   Baxenden Chemicals

3) Tegowet KL245
   Flow additive
   Tego Chemie

4) Estasol
   Coalescing solvent
   Chemoxy International

We claim:

1. A water dispersible blocked polyisocyanate of formula (I)

$$R\text{—}Y_m \qquad (I)$$

where R is an m valent group comprising an aliphatic, cycloaliphatic, heterocyclic or aromatic group and comprising (i) at least three consecutive ethylene oxide groups or (ii) at least one residue of a polyhydroxy carboxylic acid, and the groups Y are the same or different and each Y is a group of formula (II)

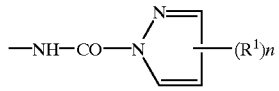
(II)

where each

R$^1$ is selected from the group consisting of alkyl, alkenyl, aralkyl, N-substituted carbamyl, phenyl, NO$_2$, halogen and groups —C(O)—O—R$^2$ where R$^2$ is hydrogen or alkyl;

n is 0, 1, 2 or 3; and when n is more than 1 said groups R$^1$ are the same or different; and m is an integer of 2 or more.

2. A water dispersible mixture of blocked polyisocyanates each of the formula

where the groups R are the same or different and each is an m valent group comprising an aliphatic, cycloaliphatic, heterocyclic or aromatic group and wherein from 5 to 100 eq. wt % of said groups R comprise at least three consecutive ethylene oxide groups or at least one residue of a polyhydroxy carboxylic acid, and the groups Y are the same or different, and each Y is a group of formula (II)

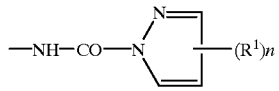
(II)

where each

R$_1$ is selected from the group consisting of alkyl, alkenyl, aralkyl, N-substituted carbamyl, phenyl, NO$_2$, halogen and groups —C(O)—O—R$^2$ where R$^2$ is hydrogen or alkyl;

n is 0, 1, 2 or 3; and when n is more than 1 said groups R$^1$ are the same or different; and m is an integer of 2 or more.

3. The blocked polyisocyanate according to claim 1 wherein at least one group Y is selected from the group consisting of

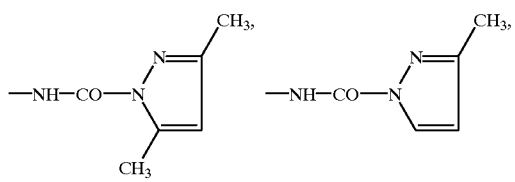

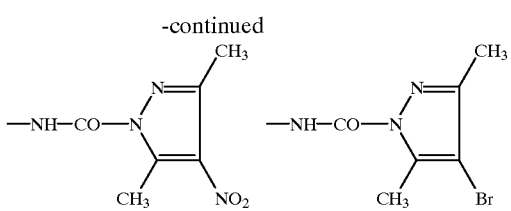

4. The blocked polyisocyanate according to claim 3 wherein at least one group Y is

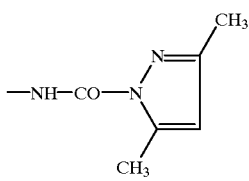

5. The blocked polyisocyanate according to claim 1 wherein m is from 2 to 6.

6. A water dispersible product according to claim 1 produced by a process comprising at least the steps of:

(a) contacting a polyisocyanate of formula (III)

$$R^a(NCO)_q \quad \text{(III)}$$

wherein R$^a$ is a q valent group comprising an aliphatic, cycloaliphatic, heterocyclic or aromatic group and q is an integer greater than 2 with (i) an active hydrogen-containing compound bearing a hydrophilic group which is —(CH$_2$CH$_2$O)$_p$— where p is 3 or more or (ii) a polyhydroxy carboxylic acid group or derivative thereof to form a water dispersible polyisocyanate of formula R(NCO)$_m$ wherein R is an m valent group comprising an aliphatic, cycloaliphatic, heterocyclic or aromatic group, comprising at least three consecutive ethylene oxide groups or a residue of a polyhydroxy carboxylic acid; and (b) blocking the water dispersible polyisocyanate produced in step (a) with a pyrazole of formula (IV)

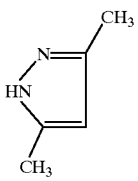
(IV)

wherein each R$^1$ is selected from the group consisting of alkyl, alkenyl, aralkyl, N-substituted carbamyl, phenyl, NO$_2$, halogen and groups —C(O)—O—R$^2$ where R$^2$ is hydrogen or alkyl, n is 0, 1, 2 or 3; and when n is more than 1 said groups R$^1$ are the same or different; and m is an integer of 2 or more.

7. A process for producing a water dispersible blocked polyisocyanate as claimed in claim 1 which process comprises contacting a polyisocyanate of formula

R(NCO)$_m$ wherein R is an m valent group comprising an aliphatic, cycloaliphatic, heterocyclic or aromatic group and comprising at least three consecutive ethylene oxide groups or at least one residue of a polyhydroxy carboxylic acid and m is an integer of 2 or more with a pyrazole of formula (IV)

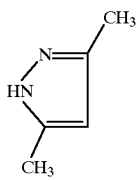

(IV)

where each $R^1$ is selected from the group consisting of alkyl, alkenyl, aralkyl, N-substituted carbamyl, phenyl, $NO_2$, halogen and groups —C(O)—O—$R^2$ where $R^2$ is hydrogen or alkyl and n is 0, 1, 2 or 3 and when n is more than 1 the groups $R^1$ are the same or different.

8. A process according to claim 7 which comprises the initial step of contacting a polyisocyanate of formula (III)

$R^a(NCO)_q$ (III)

wherein $R^a$ is a q valent group comprising an aliphatic, cycloaliphatic, heterocyclic or aromatic group and q is an integer greater than 2 with an active hydrogen-containing compound bearing a hydrophilic group which is —$(CH_2CH_2O)_p$— where p is 3 or more or a carboxylic acid group or derivative thereof to form a water dispersible polyisocyanate of formula $R(NCO)_m$.

9. An aqueous dispersion of at least one blocked polyisocyanate as claimed in claim 1.

10. A coating composition which comprises a dispersion as claimed in claim 9 and a compound containing an active hydrogen.

11. The coating composition according to claim 10 which is a paint.

12. The coating composition according to claim 10 which comprises a pigment and a pigment carrier, wherein the pigment carrier is the compound containing an active hydrogen.

13. The coating composition according to claim 10 which contains 0.5 to 2 blocked isocyanate groups per active hydrogen containing group.

14. A method of coating a substrate which comprises applying the coating composition according to claim 10 to a substrate and then heating the composition to crosslink the coating.

15. The method according to claim 14 which additionally comprises a further step of heating said substrate.

16. The method according to claim 14 wherein said composition is applied by electrodeposition.

17. The water dispersible product according to claim 6 wherein at least one pyrazole of formula (IV) is

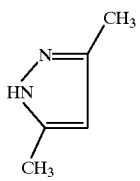

(IV)

18. The process according to claim 7 wherein at least one pyrazole of formula (IV) is 19. The process according to claim 7 such that the reaction product contains no free isocyanate groups.

20. The process according to claim 19 which comprises the initial step of contacting a polyisocyanate of formula (III)

$R^a(NCO)_q$ (III)

wherein $R^a$ is a q valent group comprising an aliphatic, cycloaliphatic, heterocyclic or aromatic group and q is an integer greater than 2 with an active hydrogen-containing compound bearing a hydrophilic group which is —$(CH_2CH_2O)_p$— where p is 3 or more or a carboxylic acid group or derivative thereof to form a water dispersible polyisocyanate of formula $R(NCO)_m$.

21. The process according to claim 19 wherein at least one pyrazole of formula (IV) is

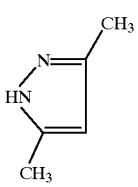

(IV)

22. The process according to claim 20 wherein at least one pyrazole of formula (IV) is

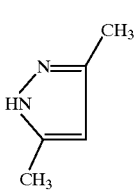

(IV)

23. The coating composition according to claim 10 which is a clear coating, a water based textile coating or a crosslinker for fabric.

24. The coating composition according to claim 23 wherein at least one group of formula (II) is

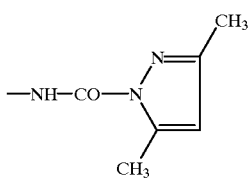

25. The coating composition according to claim 24 which contains 0.5 to 2 blocked isocyanate groups per active hydrogen containing group.

* * * * *